(12) United States Patent
Wu et al.

(10) Patent No.: US 11,519,777 B2
(45) Date of Patent: Dec. 6, 2022

(54) WEIGHING METHOD AND STORAGE MEDIUM THEREOF

(71) Applicants: Mettler Toledo Precision Instrument Company Limited, Changzhou (CN); Mettler Toledo Measurement Technology Company Limited, Changzhou (CN); Mettler-Toledo International Trading (Shanghai) Co., Ltd., Shanghai (CN)

(72) Inventors: Jianwei Wu, Changzhou (CN); Hongzhi Lin, Changzhou (CN); Ying Zhang, Changzhou (CN); Guojun Xie, Changzhou (CN); Zheng Qian, Changzhou (CN)

(73) Assignees: Mettler Toledo Precision Instrument Company Limited, Changzhou (CN); Mettler Toledo Measurement Technology Company Limited, Changzhou (CN); Mettler—Toledo International Trading (Shanghai) Co., Ltd., Shanghai (CN)

( * ) Notice: Subject to any disclaimer, the term of this patent is extended or adjusted under 35 U.S.C. 154(b) by 415 days.

(21) Appl. No.: 16/640,576

(22) PCT Filed: Jun. 29, 2018

(86) PCT No.: PCT/CN2018/093652
§ 371 (c)(1),
(2) Date: Feb. 20, 2020

(87) PCT Pub. No.: WO2019/042004
PCT Pub. Date: Mar. 7, 2019

(65) Prior Publication Data
US 2020/0173839 A1    Jun. 4, 2020

(30) Foreign Application Priority Data

Aug. 29, 2017  (CN) .......................... 201710753162.6

(51) Int. Cl.
*G01G 23/01* (2006.01)
*G01G 23/00* (2006.01)

(52) U.S. Cl.
CPC ................................. *G01G 23/002* (2013.01)

(58) Field of Classification Search
CPC ...... G01G 23/01; G01G 23/002; G01G 23/12; G01G 23/363
See application file for complete search history.

(56) References Cited

U.S. PATENT DOCUMENTS 3,657,475 A * 4/1972 Peronneau ............ G06F 3/0414
178/18.05
4,558,757 A * 12/1985 Mori .................... G06F 3/04142
178/18.05

(Continued)

FOREIGN PATENT DOCUMENTS

CN        102778287 A    11/2012
CN        106706106 A    5/2017

*Primary Examiner* — Randy W Gibson
(74) *Attorney, Agent, or Firm* — Standley Law Group LLP; Jeffrey S. Standley; Stephen L. Grant (57) ABSTRACT

In a weighing method, a weight (W) of a measured object (7) is measured. A roll angle (r) and a pitch angle (p) of a weighing scale platform (100) are read. The coordinates of a placement position ($x_0$, $z_0$) of the measured object are acquired. A first error (error1) caused by a weighing state according to the roll angle and the pitch angle is calculated. A second error (error2) caused by a weighing position according to the coordinates of the placement position, the roll angle (r) and the pitch angle (p) is also calculated. From these, a corrected weight (Wc) is determined.

7 Claims, 4 Drawing Sheets

(56) References Cited

U.S. PATENT DOCUMENTS

| | | | |
|---|---|---|---|
| 4,799,558 A | | 1/1989 | Griffen |
| 4,848,477 A | * | 7/1989 | Oldendorf .............. G01G 23/01 |
| | | | 177/25.14 |
| 4,909,338 A | * | 3/1990 | Vitunic .................. G01G 23/01 |
| | | | 73/1.13 |
| 5,750,937 A | * | 5/1998 | Johnson ............. G01G 23/3707 |
| | | | 178/18.05 |
| 6,137,065 A | * | 10/2000 | Zefira .................. G01G 23/002 |
| | | | 33/366.26 |
| 6,621,015 B2 | | 9/2003 | Kusumoto et al. |
| 7,767,915 B2 | * | 8/2010 | Gottfriedsen .......... G01G 23/12 |
| | | | 177/1 |
| 9,417,116 B2 | | 8/2016 | Bishop |
| 9,612,149 B2 | | 4/2017 | Burkhard |
| 11,300,442 B2 | * | 4/2022 | Blankley, Jr. ........ G01G 23/363 |
| 2008/0264141 A1 | * | 10/2008 | Kenmochi ........... G01G 3/1414 |
| | | | 73/1.08 |
| 2011/0119028 A1 | * | 5/2011 | Bishop ................. G01G 23/015 |
| | | | 73/1.13 |

* cited by examiner

WEIGHING METHOD AND STORAGE MEDIUM THEREOF

FIELD OF THE INVENTION

The present invention relates to a weighing method, and mainly to a weighing method for performing accurate weighing in a horizontal state and an inclined state, and a storage medium.

THE RELATED ART

A weighing sensor is a basic element for measuring the weight of an object, which converts the weight of a measured object into the deformation of an elastomer element, and then into an electrical signal for identification and measurement, so as to obtain the weight of the weighed object.

At present, for many commercial scales, especially in high-precision applications, each product will be equipped with a horizontal bubble for adjusting the horizontal state of the weighing scale body, thereby ensuring the metering performance. When using such a product, the position of a horizontal bubble is observed first, and if the horizontal bubble deviates from a horizontal state, adjust four corners of the product, so that the product returns to a horizontal position. Therefore, this requires additional human operations and the time for the operations is long.

When performing weighing, it is generally necessary to place the centre of gravity of the weighed product in the centre of the weighing scale platform, while during the actual application, the centre of gravity of the weighed product is not in the centre of the weighing scale platform due to the difference in the placement position and the uneven density of the weighing product, which also leads to weighing errors, called eccentric load error. Taking the electronic weighing scale as an example, the method for adjusting the eccentric load error is: selecting several points on the weighing scale platform of the electronic weighing scale to place weights, recording the weighing value at different measuring points, calculating adjustment parameters according to the weighing value, and then correcting the elastomer element by removing material from the bending zones of the parallel guides by grinding or filing according to the adjustment parameters, so as to change the sensitivity of the elastomer element to the weighing value at different measuring positions.

The disadvantages of this method are as follows: first, this method requires human manual operation, so that the efficiency is low, and due to the different measuring positions of placing the weights and the effects of the number of the measuring positions on the calculation of the adjustment parameters, the final weighing value is affected; second, when a final user uses the electronic weighing scale, if the table on which the electronic weighing scale is placed is inclined, while the final user does not adjust the eccentric load error, but directly uses the electronic weighing scale for measurement, the inclined table and the measuring position where the weighing object is placed will affect the weighing value.

In order to facilitate the use by a customer and to ensure the metering performance of the product, some products provide an automatic inclination compensation function, measuring the inclined angle by the inclined sensor and automatically compensating for weight changes caused by the inclination, and the customer can use the product without adjusting to a horizontal state during use, thereby saving time and labour for the customer. However, this method does not involve a correction method for weight errors caused by the different measuring positions where the measured object is placed in an inclined state of the weighing scale platform.

SUMMARY

The object of the present invention is to provide a system and method for performing weighing at any loading position in a horizontal state and an inclined state, thereby improving the weighing accuracy and improving the efficiency of the staff.

A weighing method, comprising: measuring the weight W of a measured object; reading a roll angle r and a pitch angle p of a weighing scale platform; acquiring coordinates of a placement position $(x_0, z_0)$ of the measured object; and calculating an error1 caused by a weighing state according to the roll angle r and the pitch angle p, calculating an error2 caused by a weighing position according to the coordinates of the placement position $(x_0, z_0)$ of the measured object, the roll angle r and the pitch angle p, and calculating the corrected weight Wc according to error1 and error2, $$Wc = W/((1+\text{error1})(1+\text{error2}))$$

The present invention considers an error of a weighing result due to the state of the weighing scale platform and the placement position of the measured object, calculates the error with a corresponding algorithm, and then calculates a corrected weight. The calculation method is simple and the precision is high. The above calculation of the present invention does not require human participation, thereby improving work efficiency.

Preferably, a calculation formula for the error1 caused by the weighing state is as follows, wherein, $a_{11}, a_{12}, \ldots$, and $a_{33}$ are weighing state correction parameters:

$$\text{error } 1 = f(r, p) = (1, r, r^2) * \begin{pmatrix} a_{11} & a_{12} & a_{13} \\ a_{21} & a_{22} & a_{23} \\ a_{31} & a_{32} & a_{33} \end{pmatrix} * \begin{pmatrix} 1 \\ p \\ p^2 \end{pmatrix}$$

Preferably, a calculation formula for the error2 caused by the weighing position is as follows, wherein, $a_{11}, a_{12}, \ldots$, and $a_{88}$ are weighing position correction parameters:

$$\text{error } 2 = f(x_0, z_0, r, p) =$$

$$(1, x_0, z_0, x_0 z_0, x_0 z_0^2, x_0^2 z_0, x_0^2, z_0^2) * \begin{pmatrix} a_{11} & a_{12} & a_{13} & \ldots & a_{18} \\ a_{21} & a_{22} & a_{23} & \ldots & a_{28} \\ \ldots & & & & \\ a_{81} & a_{82} & a_{83} & \ldots & a_{88} \end{pmatrix} * \begin{pmatrix} 1 \\ r \\ p \\ rp \\ rp^2 \\ r^2 p \\ r^2 \\ p^2 \end{pmatrix}$$

The present invention uses the above formulas respectively to calculate the error1 caused by the weighing state and the error2 caused by the weighing position, and the calculation is simple and convenient.

Preferably, the placement position $(x_0, z_0)$ of the measured object is directly obtained by a weighing position acquisition structure.

Preferably, the placement position ($x_0$, $z_0$) of the measured object is calculated from weighing data of two or more of the above weighing sensors with a formula as follows, wherein, $lc_1$, $lc_2$, ..., and $lc_n$ are weighing data of n weighing sensors, and n≥2; $a_0$, $a_1$, $a_2$, ..., and $a_n$ are calculation parameters for the position $x_0$; and $b_0$, $b_1$, $b_2$, ..., and $b_n$ are calculation parameters for the position $z_0$.

$$x_0 = (a_0, a_1, a_2, \ldots a_n) * \begin{pmatrix} 1 \\ lc_1 \\ lc_2 \\ \ldots \\ lc_n \end{pmatrix} \quad z_0 = (b_0, b_1, b_2, \ldots b_4) * \begin{pmatrix} 1 \\ lc_1 \\ lc_2 \\ \ldots \\ lc_n \end{pmatrix}$$

When there are a plurality of weighing sensors, the present invention uses the weighing data of the plurality of weighing sensors to calculate the placement position of the measured object, thereby reducing the weighing position acquisition structure, reducing the cost and having a simple calculation method.

The present invention further provides a weighing method, comprising: when the weighing scale platform is horizontal, measuring a weight W of a measured object; acquiring coordinates of a placement position ($x_0$, $z_0$) of the measured object; and calculating an error2 caused by a weighing position according to the coordinates of the placement position ($x_0$, $z_0$) of the measured object, and calculating the corrected weight Wc according to error2, Wc=W/(1+error2).

Preferably, the error2 caused by the weighing position is calculated by the following formula, wherein $a_{11}$, $a_{12}$, ..., and $a_{88}$ are weighing position correction parameters:

$$\text{error}2 = f(x_0, z_0) = (1, x_0, z_0, x_0 z_0, x_0 z_0^2, x_0^2 z_0, x_0^2, z_0^2) * \begin{pmatrix} a_{11} & a_{12} & a_{13} & \ldots & a_{18} \\ a_{21} & a_{22} & a_{23} & \ldots & a_{28} \\ & & \ldots & & \\ a_{81} & a_{82} & a_{83} & \ldots & a_{88} \end{pmatrix}$$

The present invention is compatible with the calculation of errors caused by the weighing position under the inclined state and the horizontal state, so as to obtain accurate weighing data, so that the present invention is easy to apply and has a wide range.

The present invention further provides a storage medium, wherein the storage medium comprises a stored program, and wherein the program, when running, controls an apparatus in which the storage medium is located to execute the weighing method as mentioned above.

In summary, the weighing method of the present invention considers the effects of the horizontal or inclined state of the weighing scale platform and the weighing position on the weighing results, and calculates errors of the weighing result caused by the horizontal or inclined state of the weighing scale platform and the weighing position, and uses the calculated errors to correct the weighing results, so that the calculation is accurate and does not require human participation, thereby improving work efficiency.

BRIEF DESCRIPTION OF THE DRAWINGS

The above-mentioned and other features, properties and advantages of the present invention will become more apparent from the following description of the embodiments with reference to the accompanying drawings, and the same reference numerals in the figures denote the same features throughout, wherein.

REFERENCE NUMERALS

100 Weighing scale body
1 Weighing scale platform
2 Weighing process control unit
3 Weighing sensor
4 Weighing position acquisition structure
5 Weighing state identification device
6 Display
7 Measured object

DETAILED DESCRIPTION OF EMBODIMENTS

To make the above objects, features and advantages of the present invention more easy to understand, the present invention will be further described in detail below in conjunction with the accompanying drawings and particular embodiments.

Embodiments of the present invention will now be described in detail with reference to the accompanying drawings. Reference will now be made in detail to preferred embodiments of the present invention, examples of which are illustrated in the accompanying drawings. The same reference numerals used in all the figures denote identical or similar parts wherever possible. Furthermore, although the terms used in the present invention are selected from well-known common terms, some of the terms mentioned in the description of the present invention may have been selected by the applicant according to his or her judgement, and the detailed meaning thereof is described in the relevant section described herein. Furthermore, the present invention must be understood, not simply by the actual terms used but also by the meanings encompassed by each term.

First Embodiment

Figure 1:
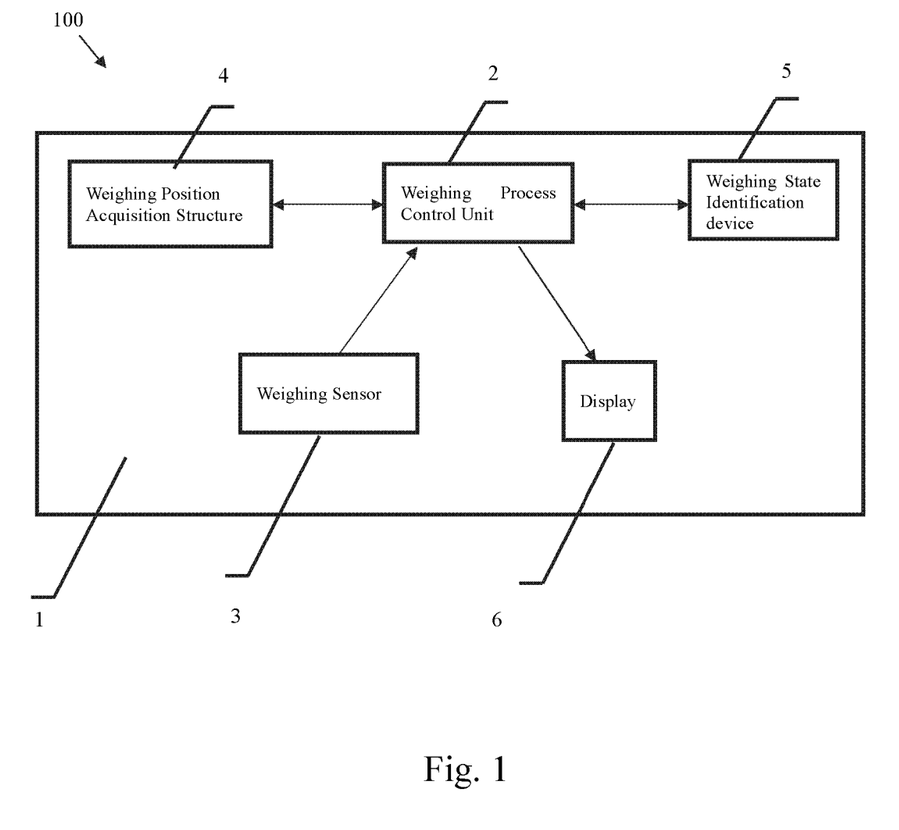
FIG. 1 shows a block diagram of the electronic weighing structure of the present invention.
Figure 2:
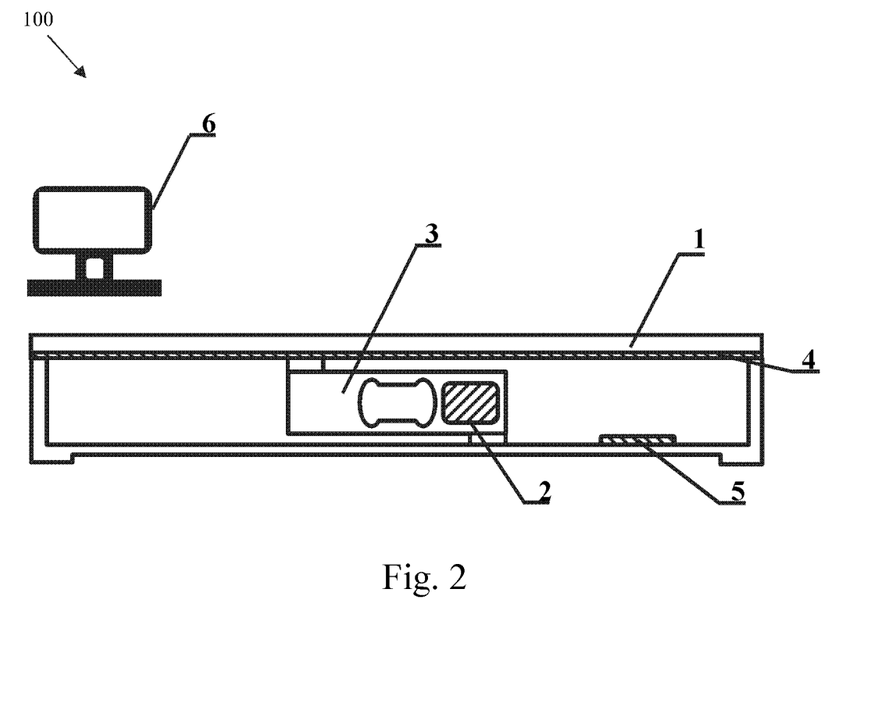
FIG. 2 shows a schematic diagram of an electronic scale structure to which the block diagram of the electronic weighing structure shown in FIG. 1 is applied.

FIG. 1 shows a block diagram of the electronic weighing structure of the present invention. FIG. 2 shows a schematic diagram of an electronic scale structure to which the block diagram of the electronic weighing structure shown in FIG. 1 is applied.

As shown in FIGS. 1 to 2, the electronic weighing structure comprises:

a weighing scale platform 1, wherein a measured object is placed on the weighing scale platform 1 for weighing;

a weighing sensor 3 located inside a weighing scale body 100, which is used for converting the weight of the measured object into deformation of an elastomer element, and then converting the deformation into an electrical signal for identification and measurement, so as to obtain the weight of the weighed object;

a weighing process control unit 2 mounted on the weighing sensor 3, which is the core module of the entire weighing system, and is used for acquiring the original weighing signal output by the weighing sensor and performing signal processing on the original weighing signal; obtaining state information output by a weighing state identification device 5 and position information output by a weighing position acquisition structure 4, then calculating a weight correction value and correcting the weighing signal;

the weighing position acquisition structure 4 mounted below the weighing scale platform 1, which has the same size as the weighing scale platform 1 for identifying the position of weighing, and is used for receiving instructions from the weighing process control unit 2 or outputting the position information to the weighing process control unit 2, wherein the weighing position acquisition structure 4 may be a capacitive sensing touch screen, a resistive pressure touch screen, a surface acoustic wave touch screen, an infrared sensing touch screen or a position measurement system;

the weighing state identification device 5 mounted independently inside the weighing scale body 100, which is used for obtaining the horizontal or inclined state of the weighing scale body, wherein the weighing state identification device 5 may be an accelerometer, an angle sensor or a capacitive inclination angle sensor; and a display 6 which is used for displaying a weight value or other information about the measured object, and may be combined with the weighing scale body 100 to form an integral weighing scale or a separate weighing scale.

For a commercial scale, generally, only one weighing sensor 3 is required, and in order to save space, the weighing state identification device 5 can be integrated in the weighing process control unit 2.

Figure 3:
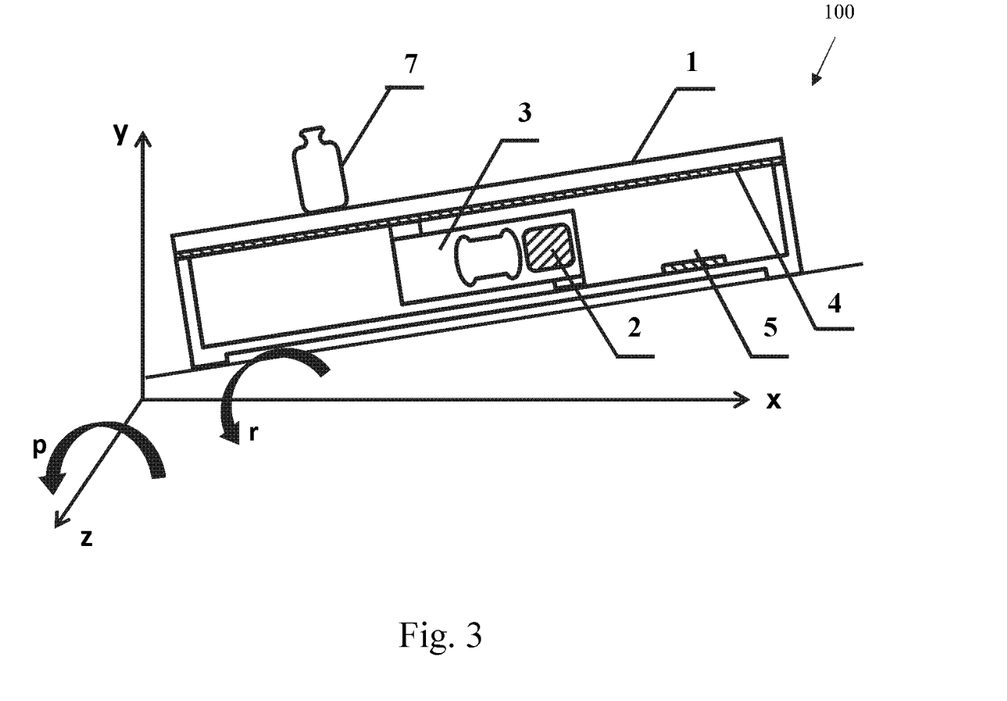
FIG. 3 shows a schematic diagram of an electronic scale structure to in the inclined state of the present invention.

FIG. 3 shows a schematic diagram of an electronic scale structure in the inclined state of the present invention.

When the weighing scale body 100 is inclined, a coordinate system as shown in FIG. 3 is established, wherein the x- and z-axis are the horizontal axes of the coordinate system building a horizontal plane, and the y-axis is the vertical axis of the coordinate system. The final weighing value is calculated according to the following method:

Step 11: measuring a weight W of a measured object 7.

Step 12: when the weighing scale body 100 is inclined, acquiring a roll angle r and a pitch angle p, wherein the roll angle r is the angle that the weighing scale platform 100 rotates around the x-axis, and the pitch angle p is the angle that the weighing scale platform 100 rotates about the z-axis.

Step 13: calculating a weighing error error1 caused by a weighing state according to the following formula:

$$\text{error1} = f(r, p) = (1, r, r^2) * \begin{pmatrix} a_{11} & a_{12} & a_{13} \\ a_{21} & a_{22} & a_{23} \\ a_{31} & a_{32} & a_{33} \end{pmatrix} * \begin{pmatrix} 1 \\ p \\ p^2 \end{pmatrix}$$

wherein $a_{11}, a_{12}, \ldots,$ and $a_{33}$ are weighing state correction parameters.

Step 14: acquiring the coordinates $(x_0, z_0)$ of the centre of gravity of the measured object 7, wherein $x_0$ is the coordinate of the centre of gravity of the measured object 7 on the x-axis, and $z_0$ is the coordinate of the centre of gravity of the measured object 7 on the z-axis.

Step 15: calculating a weighing error error2 caused by a weighing position according to the following formula:

$$\text{error 2} = f(x_0, z_0, r, p) =$$

$$(1, x_0, z_0, x_0 z_0, x_0 z_0^2, x_0^2 z_0, x_0^2, z_0^2) * \begin{pmatrix} a_{11} & a_{12} & a_{13} & \ldots & a_{18} \\ a_{21} & a_{22} & a_{23} & \ldots & a_{28} \\ \ldots & & & & \\ a_{81} & a_{82} & a_{83} & \ldots & a_{88} \end{pmatrix} * \begin{pmatrix} 1 \\ r \\ p \\ rp \\ rp^2 \\ r^2 p \\ r^2 \\ p^2 \end{pmatrix}$$

wherein $a_{11}, a_{12}, \ldots,$ and $a_{88}$ are weighing position correction parameters.

Step 16: finally, calculating a corrected weight value according to the following formula:

$$Wc = W/((1+\text{error1})(1+\text{error2}))$$

wherein Wc is an output of the weighing system after correction, and W is an output of the weighing system before correction.

In the first embodiment, the weight W of the measured object 7 is first measured in step 11, and then the weighing error error1 caused by the change of the weighing state is calculated in steps 12 and 13, and the weighing error error2 caused by the change of the weighing position is calculated in steps 14 and 15. In practice, the order of steps 11, 12 and 14 may be arbitrary, and these steps may be performed at the same time, while steps 13 and 15 need to be performed after step 12.

In this embodiment, with reference to a schematic diagram of the electronic weighing structure shown in FIGS. 1 to 2 and the electronic weighing structure of the electronic weighing scale in FIG. 3 in the inclined state, by calculating the error caused by the position of the centre of gravity of the measured object 7 and the error caused by the inclination of the weighing scale platform 1, the final weighing value is calculated according to these two errors, resulting in a simple structure and a low cost, and improving the measurement accuracy of commercial weighing scales and the like, while avoiding the manual labour of the operator, thereby greatly improving the measurement efficiency.

Second Embodiment

Figure 4:
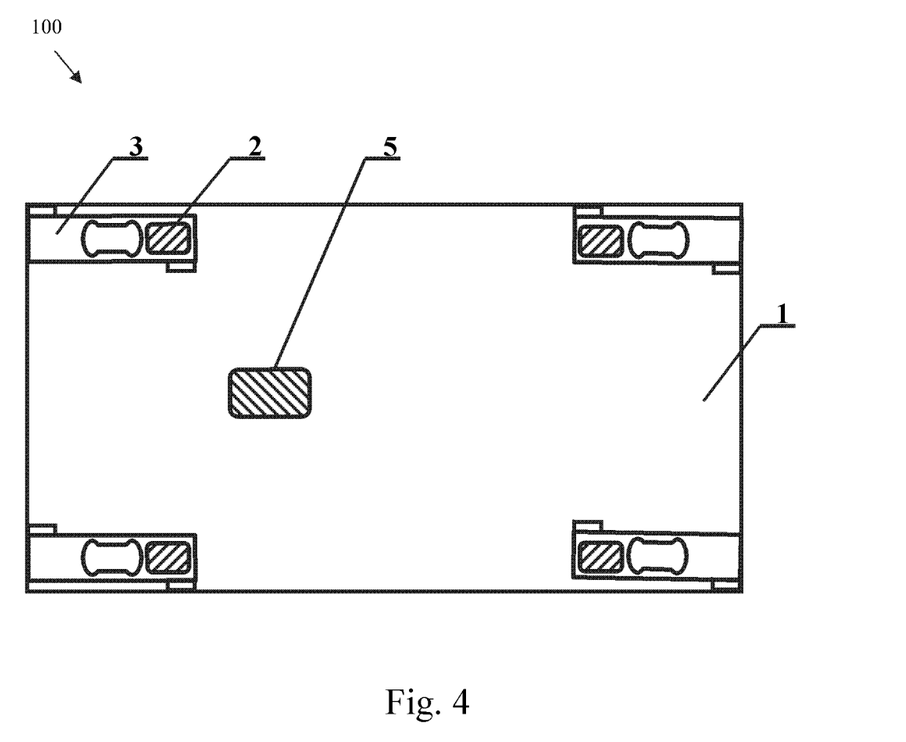
FIG. 4 shows a schematic diagram of another electronic scale structure to which the block diagram of the electronic weighing structure shown in FIG. 1 is applied.

If the weighing scale platform 1 is large, a plurality of weighing sensors 3 may be mounted, and as shown in FIG. 4, a schematic diagram of another electronic scale structure to which the block diagram of the electronic weighing structure shown in FIG. 1 is applied.

The differences between the second embodiment and the first embodiment are as follows: in the first embodiment, there is only one weighing sensor 3, and the weighing position acquisition structure 4 acquires the coordinates $(x_0, z_0)$ of the measured object; while the second embodiment comprises four weighing sensors 3 which are respectively provided at four corners within the weighing scale body 100, and a weighing process control unit 2 is provided on any one of the weighing sensors 3; the weighing state identification device 5 can be independently mounted inside the weighing scale body 100, and can also be integrated in the weighing process control unit 2 of any one of the weighing sensor 3.

In this embodiment, the four weighing sensors 3 constitute a position measurement system, and the position of the centre of gravity of the measured object 7 can be calculated by using weighing results of the four weighing sensors 3.

According to a schematic diagram of another electronic weighing scale in the second embodiment, the calculation is performed according to the following method:

Step 21: measuring a weight W of a measured object 7.

Step 22: when the weighing scale body 100 is inclined, reading a roll angle r and a pitch angle p from a weighing state identification device 5.

Step 23: after placing the measured object 7 on a weighing scale platform 1, reading weighing data of the four weighing sensors 3, and calculating the position $(x_0, z_0)$ of the centre of gravity of the measured object according to the following formula, $$x_0 = (a_0, a_1, a_2, a_3, a_4) * \begin{pmatrix} 1 \\ lc_1 \\ lc_2 \\ lc_3 \\ lc_4 \end{pmatrix} \quad z_0 = (b_0, b_1, b_2, b_3, b_4) * \begin{pmatrix} 1 \\ lc_1 \\ lc_2 \\ lc_3 \\ lc_4 \end{pmatrix}$$

wherein lc1, lc2, lc3, and lc4 are weighing data of the four weighing sensors 3; $a_0$, $a_1$, $a_2$, $a_3$, and $a_4$ are calculation parameters for the position $x_0$; and $b_0$, $b_1$, $b_2$, $b_3$, and $b_4$ are calculation parameters for the position $z_0$.

Step 24: repeating the above step 13 to calculate an error1 caused by a weighing state.

Step 25: repeating the above step 15 to calculate an error2 caused by a weighing position.

Step 26: finally, repeating the above step 16 to calculate the corrected weight value.

If the weighing scale platform is larger, 6, 8, or even more weighing sensors 3 are required to be used, but the method can still be performed by the above steps.

In the first and second embodiments, the weighing scale platform is a regular square structure, and if the weighing scale platform 100 is in a round or other shape, several weighing sensors 3 may be provided according to the actual shape. For example, if the weighing scale platform 100 is round, a weighing sensor may be provided at the centre of the weighing scale platform and weighing sensors may be provided at the periphery of the weighing scale platform 100.

In this embodiment, with reference to a schematic diagram of another electronic weighing structure of the electronic weighing scale in FIG. 4, the error caused by the position of the centre of gravity of the measured object 7 is calculated from the weighing data of each of the weighing sensors 3, then the error caused by the inclination of the weighing scale platform 100 is calculated, and then the final weighing value is calculated according to these two errors, resulting in a simple structure and a low cost, and improving the measurement accuracy of industrial weighing scales and the like, while avoiding the manual labour of the operator, thereby greatly improving the measurement efficiency.

Third Embodiment

The differences between the third embodiment and the first embodiment are as follows: in the first embodiment, the weighing scale platform 100 is inclined, so the roll angle r and the pitch angle p are required to be obtained; while in the third embodiment, the weighing scale platform 100 is placed horizontally, so the roll angle r=0, the pitch angle p=0, and the calculation method thereof is as follows:

Step 31: reading coordinates $(x_0, z_0)$ of the centre of gravity of a measured object 7, wherein $x_0$ is the coordinate of the centre of gravity of the measured object 7 on the x-axis, and $z_0$ is the coordinate of the centre of gravity of the measured object 7 on the z-axis.

Step 32: calculating an error2 caused by a weighing position according to the following formula:

$$\text{error}2 = f(x_0, z_0) = (1, x_0, z_0, x_0 z_0, x_0 z_0^2, x_0^2 z_0, x_0^2, z_0^2) * \begin{pmatrix} a_{11} & a_{12} & a_{13} & \cdots & a_{18} \\ a_{21} & a_{22} & a_{23} & \cdots & a_{28} \\ \cdots & & & & \\ a_{81} & a_{82} & a_{83} & \cdots & a_{88} \end{pmatrix}$$

wherein $a_{11}$, $a_{12}$, ..., and $a_{88}$ are weighing position correction parameters.

Step 33: finally, calculating a corrected weight value according to the following formula:

$$Wc = W/(1 + \text{error}2)$$

wherein Wc is an output of the weighing system after correction, and W is an output of the weighing system before correction.

The technical solutions in the present invention not only can correct the weighing value when the weighing scale platform 100 is inclined, but also can calculate a correction value for the weighing scale platform 100 placed horizontally, which have a wide application range, a simple structure, a low cost, thereby avoiding the manual labour of the operator and greatly improving work efficiency.

Through the above description of the weighing methods, it can be clearly understood by those skilled in the art that the present invention can be implemented by means of software and necessary hardware platforms. Based on such understanding, the technical solutions of the present invention, essentially or for a contribution part in the prior art, can be embodied in the form of a software product, wherein the computer software product may be stored in a storage medium, including but not limited to a ROM/RAM (Read Only Memory/Random Access Memory), a magnetic disk, an optical disk, etc., and may include several instructions for causing one or more computer devices (which may be a personal computer, a server, or a network device, or the like) to perform the method described in the various embodiments or in certain parts of the embodiments of the present invention.

The weighing method of the present invention may be described in the general context of the computer-executable instructions to be executed by a computer, such as a program module. Generally, the program module includes programs, objects, components, data structures, and so on that execute particular tasks or implement particular abstract data types. The present invention may also be practiced in a distributed computing environment in which the tasks are executed by remote processing devices that are connected via a communications network. In the distributed computing environment, the program module may be located in local and remote computer storage media including the storage device.

While the particular embodiments of the present invention have been described above, a person skilled in the art should understand that these are merely illustrative, and that the scope of protection of the present invention is defined by the appended claims. Various alterations or modifications to these embodiments can be made by a person skilled in the art without departing from the principle and essence of the present invention; however, these alterations and modifications all fall within the scope of protection of the invention.

What is claimed is:

1. A method of weighing an object on a scale comprising a weighing sensor, a weighing state identification system, a weighing position acquisition structure and a weighing process control unit, the method comprising the steps of:
   measuring, by the weighing sensor, a weight of the object on a weighing scale platform;
   reading, by the weighing state identification system, a roll angle (r) and a pitch angle (p) of the weighing scale platform;
   acquiring, by the weighing position acquisition structure, coordinates of a placement position ($x_0$, $z_0$) of the object; and
   calculating, by the weighing process control unit, a corrected weight (Wc) of the object by:
     calculating a first error (error1) caused by a weighing state according to the roll angle (r) and the pitch angle (p)
     calculating a second error (error2) caused by a weighing position according to the coordinates of the placement position ($x_0$, $z_0$) of the object, the roll angle (r) and the pitch angle (p), and
     applying the equation:
     $Wc = W/((1+\text{error1})(1+\text{error2}))$ 2. The weighing method of claim 1, wherein the step of calculating the first error (error1) is by the formula:

$$\text{error1} = (1, r, r^2) * \begin{pmatrix} a_{11} & a_{12} & a_{13} \\ a_{21} & a_{22} & a_{23} \\ a_{31} & a_{32} & a_{33} \end{pmatrix} * \begin{pmatrix} 1 \\ p \\ p^2 \end{pmatrix}$$

wherein, $a_{11}$, $a_{12}$, . . . , and $a_{33}$ are weighing state correction parameters.

3. The weighing method of claim 1, wherein the step of calculating the second error (error2) is by the formula:

$$\text{error2} = (1, x_0, z_0, x_0 z_0, x_0 z_0^2, x_0^2 z_0, x_0^2, z_0^2) * \begin{pmatrix} a_{11} & a_{12} & a_{13} & \ldots & a_{18} \\ a_{21} & a_{22} & a_{23} & \ldots & a_{28} \\ & & \ldots & & \\ a_{81} & a_{82} & a_{83} & \ldots & a_{88} \end{pmatrix} * \begin{pmatrix} 1 \\ r \\ p \\ rp \\ rp^2 \\ r^2 p \\ r^2 \\ p^2 \end{pmatrix}$$

wherein, $a_{11}$, $a_{12}$, . . . , and $a_{88}$ weighing position correction parameters.

4. The weighing method of claim 1, wherein the weighing position acquisition structure directly acquires the placement position ($x_0$, $z_0$) of the object.

5. The weighing method of claim 1, there are at least two weighing sensors, which provide weighing data to calculate the placement position ($x_0$, $z_0$) of the object by the formulas:

$$x_0 = (a_0, a_1, a_2, \ldots a_n) * \begin{pmatrix} 1 \\ lc_1 \\ lc_2 \\ \ldots \\ lc_n \end{pmatrix} \quad z_0 = (b_0, b_1, b_2, \ldots b_n) * \begin{pmatrix} 1 \\ lc_1 \\ lc_2 \\ \ldots \\ lc_n \end{pmatrix}$$

wherein, $I_{c1}$, $I_{c2}$, . . . , and $I_{Cn}$ are weighing data of the n weighing sensors, where n is at least 2; $a_0$, $a_1$, $a_2$, . . . , and $a_n$ are calculation parameters for the position $x_0$; and $b_0$, $b_1$, $b_2$, . . . , and $b_n$ are calculation parameters for the position $z_0$.

6. A method of weighing an object on a horizontal weighing scale platform, comprising the steps of:
   measuring a weight (W) of the object;
   acquiring coordinates of a placement position ($x_0$, $z_0$) on the weighing scale platform of the object;
   calculating a second error (error2) caused by a weighing position according to the coordinates of the placement position ($x_0$, $z_0$), and
   calculating a corrected weight (Wc) according to the second (error2), $Wc = W/(1+\text{error2})$ 7. The weighing method of claim 6, wherein a calculation method for the second error (error2) caused by a weighing position is as follows:

$$\text{error2} = (1, x_0, z_0, x_0 z_0, x_0 z_0^2, x_0^2 z_0, x_0^2, z_0^2) * \begin{pmatrix} a_{11} & a_{12} & a_{13} & \ldots & a_{18} \\ a_{21} & a_{22} & a_{23} & \ldots & a_{28} \\ & & \ldots & & \\ a_{81} & a_{82} & a_{83} & \ldots & a_{88} \end{pmatrix}$$

wherein, $a_{11}$, $a_{12}$, . . . , and $a_{88}$ are weighing position correction parameters.

* * * * *